Figure 1:
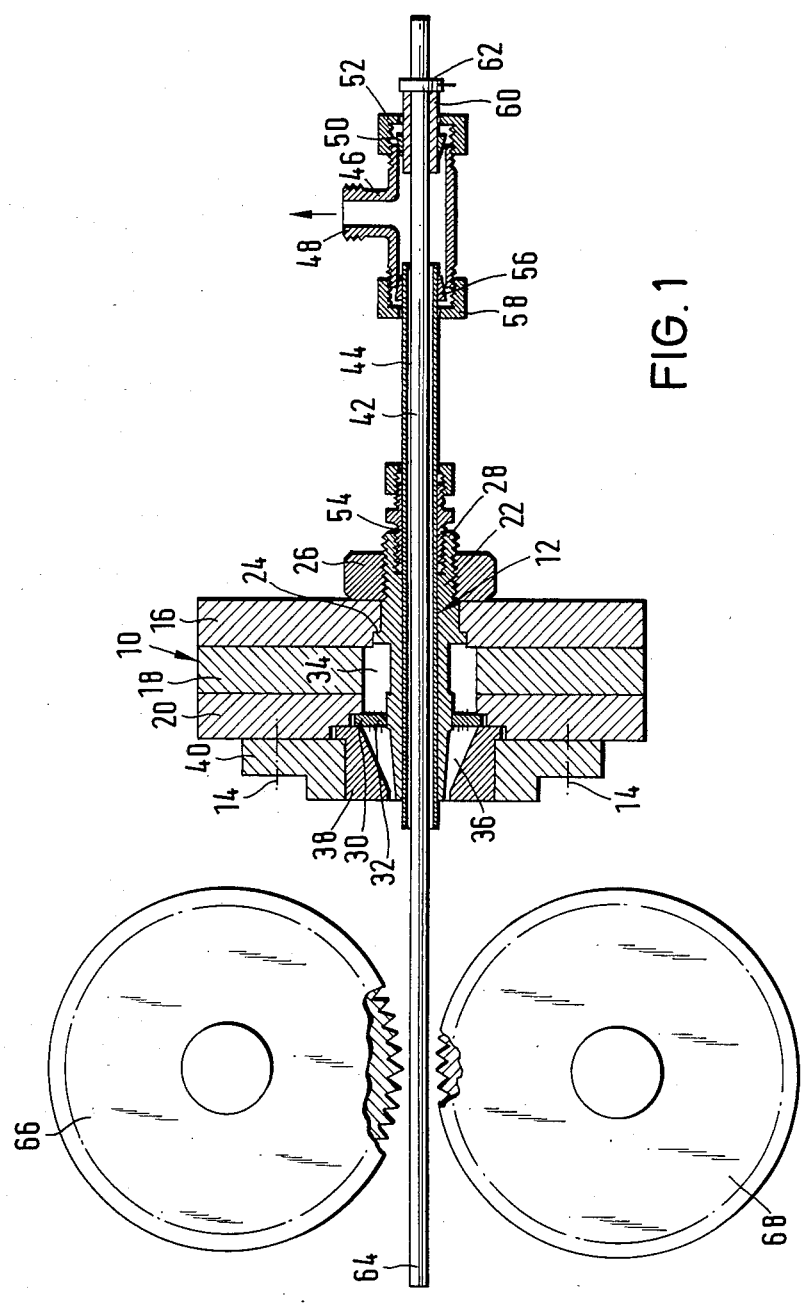

United States Patent [19]

Schaaf et al.

[11] Patent Number: 4,630,533
[45] Date of Patent: Dec. 23, 1986

[54] COOKING EXTRUDER

[75] Inventors: Heinz Schaaf, Camberg-Oberselters; Horst Walter, Grevenbroich, both of Fed. Rep. of Germany

[73] Assignee: Convent Knabber-Geback GmbH & Co., Cologne, Fed. Rep. of Germany

[21] Appl. No.: 772,636

[22] Filed: Sep. 5, 1985

[30] Foreign Application Priority Data

Sep. 7, 1984 [DE] Fed. Rep. of Germany ....... 3433013

[51] Int. Cl.⁴ .......................... A47J 37/00; A21C 9/06
[52] U.S. Cl. ........................................ 99/353; 99/355; 99/450.6; 99/450.7; 425/133.1; 426/516
[58] Field of Search ................. 99/352, 355, 353, 354, 99/388, 450.6, 450.7; 425/133.1, 113, 130, 376, 405 R, 462, 466; 426/281, 283, 516, 523

[56] References Cited

U.S. PATENT DOCUMENTS

| | | | |
|---|---|---|---|
| 3,537,386 | 11/1970 | Grosbard | 99/353 |
| 3,679,338 | 7/1972 | Lutz | 99/450.7 X |
| 3,751,202 | 8/1973 | Coleman | 425/133.1 X |
| 4,028,024 | 6/1977 | Moreland | 425/133.1 |
| 4,259,051 | 3/1981 | Shatila | 425/133.1 |
| 4,275,647 | 6/1981 | Chambers | 99/355 X |
| 4,486,163 | 12/1984 | Pfeilstetter | 99/450.7 X |

Primary Examiner—Billy J. Wilhite
Attorney, Agent, or Firm—Anthony J. Casella; Gerald E. Hespos

[57] ABSTRACT

In this cooking extruder the nozzle head (12) is disposed in a nozzle plate (10) and the passage (34) through which the material for the envelope body is supplied extends at an angle to the axis of a filling tube (42) through which the filling material is introduced into the extruded envelope body. When clogging occurs during production the filling tube (42) can be withdrawn from the nozzle head (12) and replaced by a new filling tube. The front end of the filling tube (42) is led between forming rolls (66, 68) and serves as abutment for said rolls. This makes it possible to form the surface of the envelope body with a pattern or bake said surface locally or over the entire periphery. In the nozzle head (12) a baffle plate (30) is disposed with the aid of which a uniform distribution of the material supplied for the envelope body may be achieved. An annular space between a lining tube (28) in the hollow mandrel (22) and the filling tube (42) may be subjected to suction extraction.

19 Claims, 7 Drawing Figures

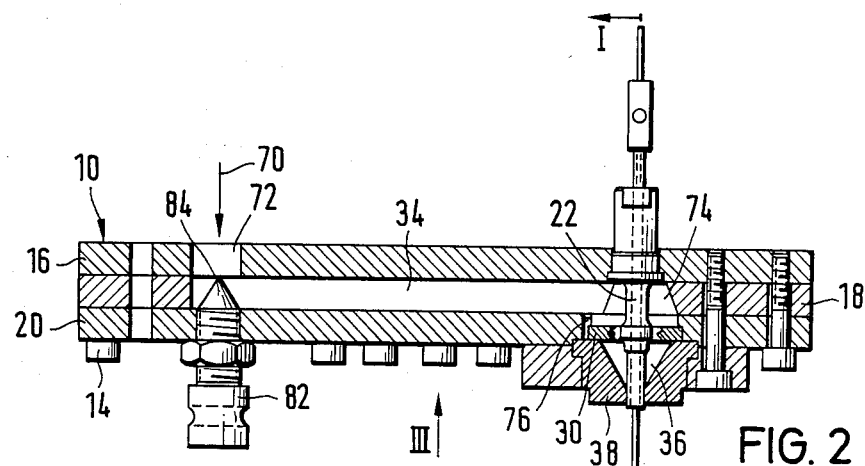
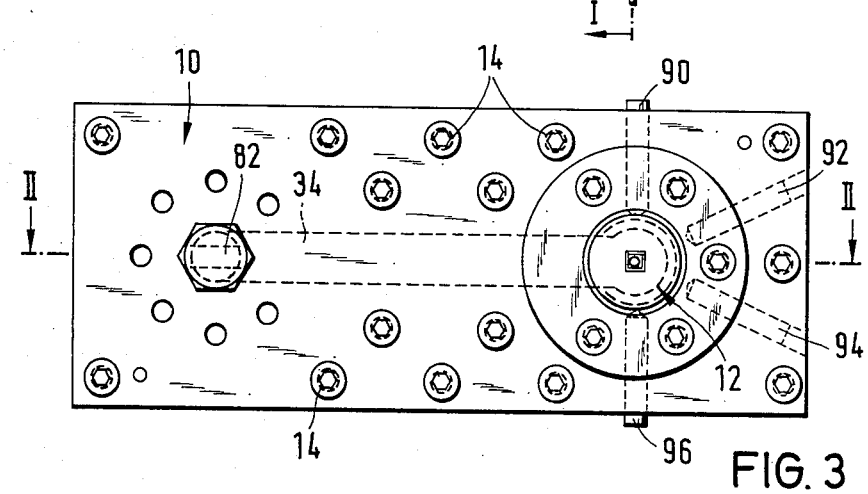
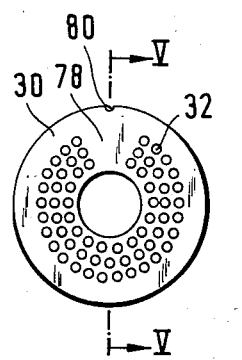
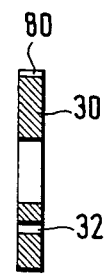
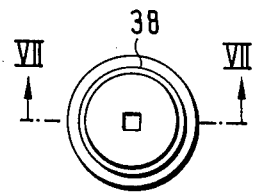

COOKING EXTRUDER

The invention relates to a cooking extruder with an extruder screw for supplying the material for an envelope body and a nozzle head, a filling tube for supplying the material of a filling being led through the nozzle head and being surrounded by an annular space which is possibly connectable to a partial vacuum source, the material of the envelope body being supplied at an angle to the axis of the filling tube.

With such a nozzle head for a cooking extruder a sheath or envelope body is continuously formed which in one operation is continuously filled with an edible composition. The filling composition is pressed through the filling tube and the envelope material supplied through the extruder screw is ejected round a hollow mandrel which for thermal reasons encloses with the filling tube an insulating annular space. With a nozzle or die head formed in this manner blockages of the filling tube can easily occur and this leads to interruption of production until the filling tube has been cleaned. It is further possible due to irregular pressure distribution in the nozzle head and temperature differences in the composition for the envelope material led round the hollow mandrel to form faults in the envelope body.

The problem underlying the invention is to further develop a cooking extruder of the type according to the preamble so that at any time a uniformly well formed envelope body is obtained and no defects influencing the production occur in the supply of the filling material.

The solution of this problem is achieved according to the invention in that the filling tube is disposed detachably within the annular space and adapted to be withdrawn from the nozzle head.

Should the filling tube become clogged it is not necessary to switch off the cooking extruder until the filling tube has been cleaned but after withdrawing the clogged filling tube a cleaned filling tube connected to the supply line for the filling composition can be inserted. It is further possible to adjust the length of the region of the filling tube projecting in front of the nozzle head so that a rapid adaptation to various properties of the material of the envelope composition and of the filling composition is possible.

According to a preferred embodiment the axis of the nozzle head is arranged parallel offset to the axis of the extruder screw so that the filling tube can be withdrawn rearwardly from the nozzle head. Furthermore, the filling tube is preferably disposed within a guide tube and the guide tube forms simultaneously the hollow mandrel, i.e. the inner side of the nozzle for the material of the envelope body. To prevent the filling tube from unintentionally slipping out of the nozzle head forwardly it is preferably provided at the region projecting behind the nozzle head with a clamp or a clampable ring which serves as abutment and bears against the rear side of the nozzle head.

At the outlet end of the extruder preferably a nozzle plate disposed at right-angles and having an inner passage for guiding the material of the envelope body is formed.

According to a preferred embodiment in front of the nozzle head forming rolls are disposed and the filling tube is led through the forming rolls. The filling tube preferably forms an abutment for the forming rolls so that the pressure necessary for forming a pattern on the outside of the envelope body can be applied without undesirable deformation of the envelope body.

To permit a local heat treatment of the outside of the envelope body the forming rolls are preferably heatable. The forming rolls can be provided in particular with a pattern or mark and are heated to red heat so that the envelope body can be formed with a sort of brand mark.

To ensure a uniform constituency of the envelope body in a further development of the invention heating elements are disposed round the nozzle head. Said heating elements, which are preferably constructed in the form of heating cartridges, are disposed in particular at the extruder-remote side of the nozzle head because there the composition of the envelope body is cooled to a greater extent than at the extruder-adjacent side. By the heating it is achieved that the composition round the entire hollow mandrel has the same consistency during its exit from the nozzle head.

Furthermore, the filling tube may be constructed as multiple filling tube so that within a rectangular, circular, oval or compositely shaped envelope body various compositions may be simultaneously extruded.

According to a preferred further embodiment the filling tube is adapted to be connected to a pressurized gas source, the pressurized gas preferably being compressed air so that on extrusion of the sheath or envelope body the latter can be inflated in order to further reduce the smallest possible wall thickness of the envelope body depending on the material of the latter and the nozzle form.

If during the blowing in of for example compressed air a solid in powder form or a liquid is also injected and at the front end of the filling tube a guide mandrel is disposed, the inner wall of the inflated envelope body can be sprayed.

A uniform formation of the envelope body is also preferably achieved in that in the nozzle head a baffle plate is disposed round the guide tube for the filling tube. Said baffle plate is provided with a perforation for the uniform distribution of the material flow before the exit from the nozzle head, and in particular more passage holes are diposed at the extruder-remote side of the baffle plate than at the extruder-adjacent side. As a result more material is led round the guide tube because the resistance in the extruder-adjacent region of the baffle plate is greater.

An adjustment of the pressure in the material for the envelope body and thus an improvement of the extruded envelope body can also preferably be achieved in that for setting the pressure in the envelope material a setting screw is disposed in front of the extruder end. Said screw is preferably constructed in the form of a nozzle needle with conical tip.

The nozzle plate may for example be made up of three plates screwed together, the centre plate having an elongated hole for guiding the envelope material. According to a preferred embodiment the nozzle plate is made in two parts, and in each plate grooves are machined which assembled together form the passage for the envelope material.

For producing extruded foodstuffs with open envelope body and possibly several filling materials introduced, between the annular nozzle and filling tube a separating element may be disposed and in front of the nozzle head a further filling tube, the filling tube simultaneously serving for separation of the desired breakage point formed by the separating element in the envelope body.

Examples of embodiment of the invention will be explained with the aid of the drawings, wherein:

FIG. 1 is a longitudinal section through a nozzle head along the line 1—I of FIG. 2, FIG. 2 is a horizontal section through a nozzle plate with nozzle head, FIG. 3 is a plan view of a nozzle plate according to the arrow III of FIG. 2, FIG. 4 is a plan view of a baffle plate, FIG. 5 is a section through a baffle plate along the line V—V of FIG. 4, FIG. 6 is a plan view of the nozzle for the envelope body and FIG. 7 is a section through the nozzle according to the line VII—VII of FIG. 6.

The arrangement shown in FIG. 1 for making a foodstuff consisting of an envelope or sheath body and possibly a filling disposed in said envelope body consists of a nozzle plate 10 in which in one region a nozzle head 12 is disposed. The nozzle plate 10 in the embodiment shown comprises three plates tightened together via screws 14; in a rear plate 16 only through-bores for the nozzle head 12 and for introduction of the material flow for the envelope body are formed; a centre plate 18 comprises an elongated hole which serves for guiding the material for the envelope body from the extruder end to the nozzle head; a front plate 20 comprises a through-bore for the nozzle head and a passage bore for a setting screw which will be explained in detail with the aid of FIGS. 2 and 3.

The nozzle head 12 consists of a hollow mandrel or guide tube 22 which bears via an integrally formed shoulder 24 on the rear plate 16 and is fixed to said plate via a nut 26. In the hollow mandrel 22 a tubular lining 28 is disposed which is extended rearwardly beyond the hollow mandrel 22. Arranged in the front plate 20 is a baffle plate 30 which is formed with through-openings 32 through which the material guided through the passage 34 for the envelope body is pressed. Said material is then led through the annular space 36 which is formed by the outside of the hollow mandrel 22 and the inside of a nozzle insert 38. The nozzle insert 38 is secured via a clamping plate 40 to the nozzle plate 10 and comprises in the embodiment illustrated a square opening. The front end of the hollow mandrel 22 may also have a square outer contour so that an envelope body in the form of a rectangular tube is formed.

Within the hollow mandrel or guide tube 22 a filling tube 42 is provided, an annular space 44 closed by a T-shaped element 46 being formed between the inside of the lining 28 and the outside of the filling tube 42. Said element 46 is adapted to be connected via a pipe connection 48 to a partial vacuum source so that the steam formed in the tubular envelope body during the extrusion can be sucked off. This avoids softening of the tubular porous envelope body.

The filling tube 42 is led through the element 46 and via a conical ring 50 and a nut 52 a sealing of the element 46 at the filling tube 42 is effected. The tube 28 is secured to the hollow mandrel 22 via a sleeve 54 provided with an outer thread. The element 46 is secured to the tube 28 via a conical sealing ring 56 and a nut 58. The conical sealing ring 50 lies on the outside of a tubular portion 60 by which the filling tube 42 can be displaced or withdrawn rearwardly from the nozzle head. To prevent withdrawal from the nozzle head forwardly behind the element 46 on the filling tube 42 a clamp 62 is provided which bears on the element whilst simultaneously clamping the filling tube 42.

The region 64 of the filling tube 42 projecting in front of the nozzle head is led between two forming rolls 66 and 68. The forming rolls 66 and 68 which are provided for forming a suitable pattern on the outside of the envelope body may also for example be heatable to red heat so that a local heat treatment can take place at the outside of the envelope body. For example, with such forming rolls a trademark in the form of a brand can be applied. During the operation of the forming rolls the front region 62 of the filling tube 42 serves as abutment so that the envelope body cannot unlimitedly yield to the pressure of the forming rolls. If the forming rolls are formed with complementary flutes on appropriate heating a baking of the outside of the envelope body can take place so that a slightly baked crispy surface of the envelope material is achieved.

If during the operation of the cooking extruder clogging of the filling tube takes place it is not necessary to switch off the extruder and thus stop production because the filling tube can easily be withdrawn rearwardly from the nozzle head and replaced by a new clean filling tube through which further filling composition can be immediately introduced into the envelope body. To facilitate this manipulation the nozzle plate 10 is constructed so that behind the nozzle plate there is adequate free space for withdrawal of the filling tube. As apparent from FIG. 2 the material supplied by an extruder screw or worm which is not illustrated for the envelope body is fed in the direction of the arrow 70 into the nozzle plate 10 through the passage bore 72. In the nozzle plate 10 the material is deflected so that it can flow into the passage 34 between the plates 16 and 20. At the end of the passage 34 the hollow mandrel or filling tube 22 is disposed around which the material is led. For this purpose, in the centre plate 18 a conical widening 74 of the passage 34 is provided. From the passage 34 or widening 74 the material passes to the baffle plate 30 which is held non-rotatably by a pin 76. The baffle plate 30 comprises a perforation which matching the material to be extruded need not be uniformly distributed over the entire area. As apparent from FIGS. 4 and 5 in a region 78 at which the envelope material first arrives no perforations are formed so that the material is distributed uniformly about the hollow mandrel 22. In the baffle plate 30 a semicircular groove 80 is provided for a securing pin 76. Behind the baffle plate 30 the material passes to the annular space 36 between the outside of the hollow mandrel or guide tube 22 and the inside of the nozzle insert 38 and then leaves the nozzle head. The nozzle insert 38 is shown in plan view and in cross-section in FIGS. 6 and 7. In the embodiment illustrated the nozzle opening is square. The plates 16, 18 and 20 forming the nozzle plate 10 are clamped together via screws 14 and round the inlet opening for the envelope material and round the passage 34 as well as round the nozzle head an appropriate number of securing screws 14 is provided in order to withstand the high pressure within the nozzle plate 10. For adjusting the pressure in the material flow for the envelope body a setting screw 82 is disposed opposite the inlet opening 72 and is in the form of a jack or nozzle needle having a conical tip 84. Depending on the screw-in depth of the tip 84 the pressure in the material flow for the envelope body can be increased or decreased.

As apparent from FIG. 3, round the nozzle head heating elements 90, 92, 94 and 96 are disposed. These heating elements, for example in the form of heating cartridges, are provided on the extruder-remote side of the nozzle head 12. This makes it possible to hold the material for the envelope body supplied through the passage 34 and conducted round the hollow mandrel 22 everywhere at the same temperature and thus at the same consistency so that no flow seams or faults of any kind can occur in the extruded envelope body. The heating elements may be set to a constant predetermined temperature.

The filling tube may be constructed as multiple filling tube, i.e. within for example one cylindrical outer tube two or more filling tubes may be placed adjacent each other so that various filling compositions can be introduced into the envelope body. It is further possible to connect the filling tube to a pressurized gas source, in particular a compressed air source, to inflate the extruded envelope body so that the wall thereof can be made thinner than is possible by the geometry of the nozzle and the constituents which must be led through the nozzle gap. At the front free end of the filling tube a guide mandrel may be disposed which for example conducts powder or a liquid substance entrained with compressed air against the inner wall of an inflated envelope body. This makes it possible to spray the inner wall of the envelope body. It is further possible to arrange between the hollow mandrel 22 and the nozzle body 38 a connecting element with the aid of which a desired breakage point can be made in the extruded envelope body. In front of the nozzle head an external filling tube can then be disposed which extends into the interior of the for example inflated envelope body so that the desired breakage point is opened by this filling tube. Through the external filling tube at the same time a filling can be introduced into the opened envelope body.

We claim:

1. A cooking extruder head for use with a cooking extruder, having a source of envelope material and a source of filling material, said cooking extruder head comprising:
   a nozzle plate having opposed forward and rearward sides, said nozzle plate being characterized by forward and rearward apertures offset from one another and extending into the respective forward and rearward sides of said nozzle plate, and a passage extending between said forward and rearward apertures and providing communication therebetween, said nozzle plate being connectable to said source of envelope material at the rearward aperture therein, such that the envelope material is deliverable to the forward aperture of said nozzle plate through said passage; and
   a filling tube connectable to said source of filling material and adjustably and removably mounted to said nozzle plate and extending entirely therethrough from the rearward side to the forward side thereof, said filling tube being substantially aligned with and extending from the forward aperture therein and being angularly aligned to said passage, whereby the amount of extension of the filling tube from the forward side of said nozzle plate is selectively adjustable and whereby the filling tube is selectively removable from said nozzle plate.

2. A cooking extruder head as in claim 1 further comprising a hollow guide tube extending through said nozzle plate and surrounding said filling tube, said guide tube defining a mandrel about which said envelope material is extruded from the forward side of said nozzle plate at the forward aperture therein.

3. A cooling extruder head as in claim 2 further comprising a baffle plate having a plurality of apertures therethrough, said baffle plate being disposed in said nozzle plate adjacent the forward aperture therein, whereby the envelope material passes through said apertures in said baffle plate prior to being extruded from said nozzle plate.

4. A cooking extruder head as in claim 1 wherein the filling tube is removable from said nozzle plate by moving said filling tube in a rearward direction relative to said nozzle plate.

5. A cooking extruder head according to claim 1 further comprising a clamp mounted to said filling tube for selectively controlling the adjustment of said filling tube relative to said nozzle plate.

6. A cooking extruder head according to claim 1 further comprising a pair of spaced apart forming rolls spaced from the forward side of said nozzle plate and in line with the filling tube, said forming rolls being operative to form the envelope material extruded from the forward side of said nozzle plate at the forward aperture therein.

7. A cooking extruder head as in claim 6 wherein the filling tube is disposed intermediate and spaced from said forming rolls such that the portion of said filling tube intermediate said forming rolls defines an abutment against which the envelope material is urged by said forming rolls.

8. A cooking extruder head as in claim 6 wherein the forming rolls are heatable.

9. A cooking extruder head as in claim 8 wherein the forming rolls are provided with a pattern and are operative to form the pattern on the envelope material extruded from said forward side of said nozzle plate.

10. A cooking extruder head as in claim 1 further comprising at least one heating element disposed in said nozzle plate in proximity to said passage therein, said heating element being operative to control the temperature of the envelope material supplied through said nozzle head.

11. A cooking extruder head as in claim 10 wherein said heating element comprises a plurality of heating cartridges.

12. A cooking extruder head as in claim 10 wherein said heating element is disposed substantially adjacent the forward aperture in said nozzle plate.

13. A cooking extruder as in claim 1 wherein the filling tube comprises a plurality of filling tubes for supplying a plurality of filling materials.

14. A cooking extruder as in claim 1 further comprising a source of pressurized gas in communication with said filling tube.

15. A cooking extruder head as in claim 14 further comprising a hollow guide mandrel tube surrounding said filling tube and extending through said nozzle plate such that a generally annular gap exists between said guide mandrel and said filling tube, said annular space being in communication with said source of pressurized gas.

16. A cooking extruder head as in claim 1 further comprising adjustment means for adjusting the pressure of envelope material supplied to said cooking extruder head.

17. A cooking extruder head as in claim 16 wherein the adjustment means comprises a setting screw threadably mounted to said nozzle plate, said setting screw comprising a conical tip portion selectively movable into proximity to the rearward aperture in said nozzle plate for adjusting the size of said rearward aperture.

18. A cooking extruder as in claim 1 wherein the nozzle plate comprises forward and rearward nozzle plate halves disposed in face-to-face relationship, said forward and rearward halves each being provided with grooves disposed in alignment with one another on the facing surfaces thereof, said grooves defining the passage through said nozzle head.

19. A cooking extruder head according to claim 1 wherein the filling tube defines a first filling tube and wherein said cooking extruder head further comprises separating means for selectively defining a breakage area in said envelope material, said separating means being disposed in proximity to said forward aperture, said cooking extruder head further comprising a second filling tube substantially surrounding said first filling tube, said second filling tube being operative to break the envelope material at the breakage area defined by said separating means.

* * * * *